United States Patent
Rangarajan et al.

(10) Patent No.: US 7,366,186 B1
(45) Date of Patent: Apr. 29, 2008

(54) FORWARDING DATA IN A ROUTING ARCHITECTURE

(75) Inventors: Anand Rangarajan, Hillsboro, OR (US); Sanjay Bakshi, Hillsboro, OR (US); Satyendra Yadav, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 998 days.

(21) Appl. No.: 09/608,997

(22) Filed: Jun. 30, 2000

(51) Int. Cl.
*H04L 12/28* (2006.01)
*H04L 12/56* (2006.01)

(52) U.S. Cl. .............. 370/401; 370/402; 370/395.31; 370/395.54

(58) Field of Classification Search .............. 370/389, 370/395.31, 395.54, 351, 401, 352, 402, 370/395.53, 353, 354, 386, 390, 400, 392, 370/396, 398, 404, 405, 397, 370, 372, 395.1
See application file for complete search history.

(56) References Cited

U.S. PATENT DOCUMENTS

| | | | |
|---|---|---|---|
| 5,970,066 A * | 10/1999 | Lowry et al. ............... 370/353 |
| 6,178,171 B1 * | 1/2001 | Alexander et al. ...... 370/395.54 |
| 6,249,820 B1 * | 6/2001 | Dobbins et al. ............ 709/238 |
| 6,330,614 B1 * | 12/2001 | Aggarwal et al. .......... 709/236 |
| 6,393,026 B1 * | 5/2002 | Irwin .......................... 370/401 |
| 6,510,159 B1 * | 1/2003 | Noriyuki ..................... 370/401 |
| 6,522,627 B1 * | 2/2003 | Mauger ....................... 370/230 |
| 6,522,637 B1 * | 2/2003 | Mimura et al. ............. 370/319 |
| 6,587,469 B1 * | 7/2003 | Bragg .......................... 370/401 |
| 6,661,791 B1 * | 12/2003 | Brown ......................... 370/392 |
| 6,868,086 B1 * | 3/2005 | Putzolu et al. .............. 370/401 |
| 6,898,183 B1 * | 5/2005 | Garakani ..................... 370/238 |
| 2004/0109460 A1 * | 6/2004 | Banks et al. ................. 370/401 |

* cited by examiner

*Primary Examiner*—Edan Orgad
*Assistant Examiner*—Chuong Ho
(74) *Attorney, Agent, or Firm*—Fish & Richardson P.C.

(57) ABSTRACT

An apparatus comprises a forwarding component configured to forward data by looking up a routing table, another forwarding component configured to receive the data, and an intermediate forwarding component bridging the two components to forward the data without looking up the routing table.

22 Claims, 2 Drawing Sheets

FORWARDING DATA IN A ROUTING ARCHITECTURE

BACKGROUND

The invention relates to data forwarding in a routing architecture.

A typical router has to process both packets that need to be forwarded and control packets to compute routing table. When a router forwards data, it looks up a destination IP (internet protocol) address in a routing table. The route lookup is a time consuming process and limits the performance of the single-box component. Other forwarding operations that limit the performance include validating a header checksum, decrementing a time-to-live, and recalculating and updating the header checksum. Checksum is a sum of a group of data items used for error checking. Time-to-live refers to time before a packet of data is deleted or discarded.

DETAILED DESCRIPTION

An implementation of the invention may use a set of modularized routers and switches. In the modularized components, the network device control and management functions are separated from the packet forwarding functions. A control component performs the control packet processing and a forwarding component performs the packet forwarding functions. Such modularized components provide flexible deployment in a network architecture.

The implementation of a routing architecture described below has multiple packet forwarding components. If each forwarding component were to perform a route lookup and other associated operations such as decrementing the time-to-live field, the use of resources would limit the performance of the routing architecture. Implementations of the invention reduce the number of route lookups and associated operations when a packet is forwarded through multiple packet forwarding components.

Figure 1:
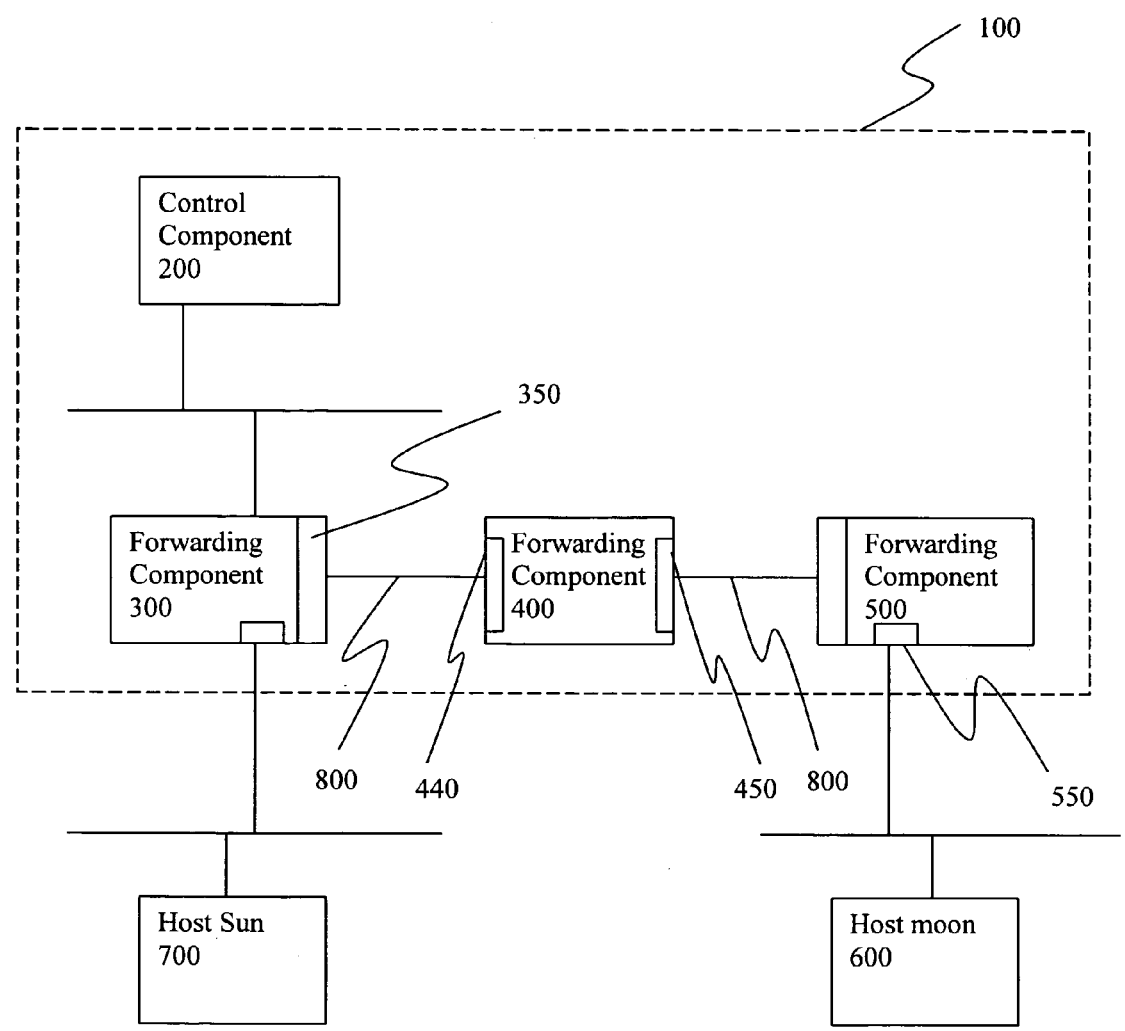
FIG. 1 illustrates a routing architecture according to an implementation of the invention.

FIG. 1 shows a networking router architecture 100 with modularized components for flexible deployment of services. The router architecture 100 demonstrates a use of modularized components where the control and management functions of network devices are separated from the packet forwarding functions. A control component 200 for controlling and managing devices is connected to a first forwarding component 300. The first forwarding component 300, a second forwarding component 400, and a third forwarding component 500 are interconnected through Ethernet 800. As the name implies, the forwarding components 300, 400, and 500 function to forward information to an intended destination, such as a host moon 600. The architecture 100 shows the three forwarding components but there could be more or fewer, depending on the topology of the destination in reference to a sender and a receiver of the information.

An implementation minimizes router lookups and other associated operations by using a mechanism that is called ARP (Address Resolution Protocol)-forwarding. There are three main aspects to ARP forwarding: routing table calculation, layer-2 forwarding, and proxy-ARP. These are explained as follows.

The control component 200 can calculate the routing table and alter the routing table for each packet forwarding component based on whether an egress-port is present in the forwarding component. An egress-port is defined as a port through which a packet leaves a router architecture for a destination. For example, for the architecture 100 as shown in FIG. 1, if the destination is the host moon 600, the egress-port would be an egress port 550 located in the third forwarding component 500. If the egress port is present in the particular forwarding component, no change is made to the table. If the egress-port is not present in the forwarding component, the control component 200 can change the table so that the "egress port" designated in the routing table is changed to a component's port that begins the best path to the egress-port. This port is called a proxy-egress-port. For example, a proxy-egress-port would be a port 350 located in the first forwarding component 300 because the egress-port is located not in the component 300 but in the third forwarding component 500. The best path would be calculated from the way the packet forwarding components are interconnected called topology information maintained in the control component 200.

The forwarding components can forward requests and packets on layer-2 through internal ports of intermediate forwarding components, for instance, the intermediate component 400. Layer-2 refers to the second layer of a standard software layering architecture model (i.e. Open Systems Interconnection) where rules and protocols are compatible within the layer. An internal port in a forwarding component is a port that connects the forwarding component to another forwarding component within the same routing architecture. Internal ports 440 and 450 are located, for example, in the second forwarding component 400 in FIG. 1.

Proxy ARP is usually used for dial-up hosts. A remote access server serving a dial-up host responds to an ARP request meant for the dial-up host with the server's own MAC address. The MAC address is used to identify devices at the Media Access Control layer in a network architecture. In ARP-forwarding used in the implementation, an egress-component, defined as a component through which a packet leaves the networking router architecture, responds to an ARP-request coming in its internal port for a host or another device connected to one of egress-component's egress ports, by generating a proxy-ARP-reply with the egress-component's MAC address. An ingress component is a component through which a packet enters the networking router architecture. The egress-component may communicate with the host on a directly connected line which may not support Ethernet.

ARP forwarding can function to minimize lookups as suggested in the following example: A packet enters a router architecture at an ingress-component, which can validate and modify at layer-3 a header of the packet and performs a route lookup to determine where the next destination and the egress-port are. The ingress-component broadcasts an ARP request for the hardware address of the destination or the next hop device of the egress-port. If the egress-port is present in the ingress component, the ARP-request is sent to the egress-port. The packet is sent to the destination when an ARP-reply comes back. But if the egress-port is not in the ingress component, the ARP-request is sent through the ingress-component's proxy-egress port. The intermediate forwarding components forward the request at layer-2 to enable the request to reach an egress-component with the egress-port. Since the request is a broadcast, it is forwarded from all ports except the one at which it entered.

Topology information of the forwarding components contained in a control component can be used to eliminate unnecessary broadcasts of the ARP request in multiple ports. After receiving the request, the egress-component replies with the MAC address of the egress-component. This ARP-reply is also forwarded at layer-2 by the intermediate components to the ingress-component. For the egress-component to know where to send back the ARP-reply, the ingress-component fills the source IP field of the ARP request with the IP address of one of the non-proxy-egress ports if the proxy-egress-port does not have an IP address. Once the ARP-reply is received, the ingress-component encapsulates the original data packet with the egress-component's MAC address and transmits the packet through its proxy-egress-port. The intermediate components forward this packet also at layer-2 to the egress-component. The egress-component then routes the packet to the destination.

In the implementation described, the internal ports of the intermediate components perform a data link relay or, in other words, a bridging function. Furthermore, the intermediate components can act as transparent bridges, automatically and independently forwarding packets to bridge the ingress-component and the egress-component.

Figure 2:
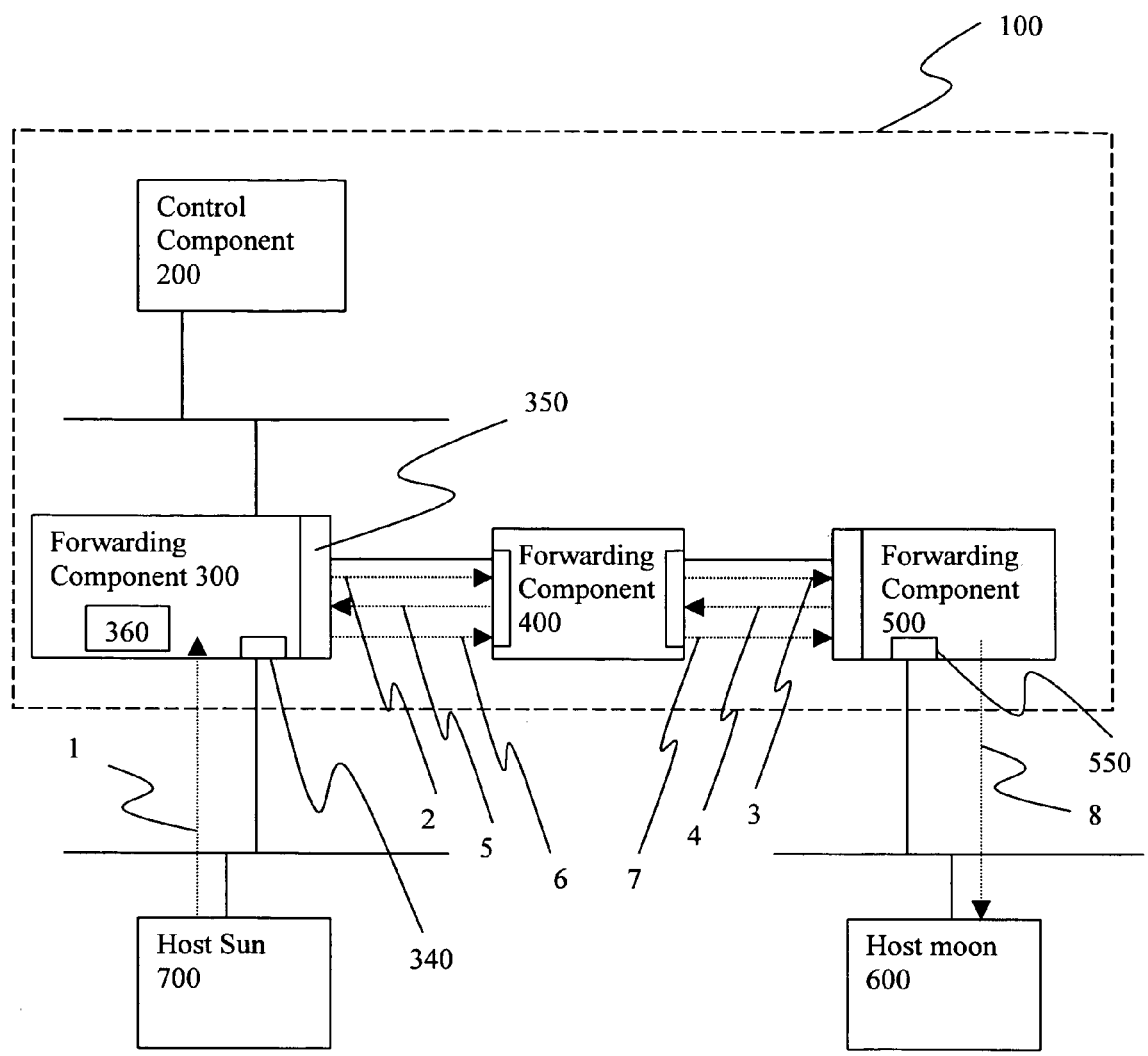
FIG. 2 illustrates packet processing in a routing architecture according to an implementation of the invention.

The above mechanism of ARP forwarding applied to the networking router architecture 100 is illustrated in FIG. 2. Assume that a packet originating from a host sun 700 is destined for the host moon 600. When a packet enters the router architecture 100 from the host sun 700 through an ingress-port 340 in phase 1, the first forwarding component 300 (the ingress-component) validates and modifies the layer-3 header of the packet and performs a route lookup by using its routing table 360 to determine the next destination and an egress-port. A port in the first forwarding component 300 is determined to be a proxy-egress port 350 and not an egress-port from which the packet can leave the architecture 100 for the destination. In phase 2, the first forwarding component 300 broadcasts an ARP-request, which reaches the second forwarding component 400 through the proxy-egress-port 350. The request is a broadcast, and therefore, it is forwarded from all ports except where it came in. In phase 3, the second forwarding component 400 forwards the ARP request to the third forwarding component 500 (the egress-component) at layer-2. The second forwarding component 400 can act as a transparent bridge that can forward packets independently without communicating to either the host 600 or the host 700. In phase 4, the third forwarding component 500 responds to the request by sending its own MAC address from an egress port 550 to the second forwarding component 400. The ARP-reply containing the MAC address is forwarded at layer-2 to the first forwarding component 300 in phase 5. In phase 6, the first forwarding component 300 completes the layer-2 encapsulation of the packet with the MAC address and transmits it through the proxy-egress-port 350. The second forwarding component 400 forwards the encapsulated packet at layer 2 to the third forwarding component 500 in phase 7. The third forwarding component 500 then routes the packet to the destination, the host moon 600, in phase 8.

In the above disclosure, the packet is "routed" only at the first forwarding component and the third forwarding component and the route look up and other associated operations are performed only at the first and third forwarding components. The intermediate components act as transparent bridges to forward the packet on layer 2. Thus, an application of ARP-forwarding to multiple forwarding components can reduce the route lookups to increase performance of the networking router architecture 100.

Implementations of the invention can be applied without modifying the existing protocols within the system. Any forwarding components that support routing and transparent bridging can be used to perform ARP forwarding to minimize route lookups.

The invention can be implemented, for example, in a computer program executable on a machine. The computer program can be stored on a storage medium, such as random access memory (RAM), readable by a general or special purpose programmable machine, for routing packets.

Other implementations are within the scope of the following claims.

What is claimed is:

1. Apparatus comprising:
   a networking router architecture comprising:
   a first component configured to perform a route look-up to identify a proxy egress port by which a data packet is to leave the first component, to send an Address Resolution Protocol (ARP) request for a hardware address of an egress port by which the data packet is to leave a networking router architecture to reach the receiver, to receive a response to the ARP request that includes the hardware address of the egress port, and to label the data packet with information identifying the hardware address of the egress port;
   a second component comprising the egress port and configured to receive the data packet; and
   an intermediate component bridging the first component and the second component and acting as a transparent bridge to forward the ARP request and the labeled data packet based on the hardware address of the egress port wherein the receiver is outside of the network router architecture.

2. The apparatus of claim 1, wherein the networking Router architecture further comprises additional intermediate components bridging the first component and the second component to forward the data.

3. The apparatus of claim 1 wherein the first component is configured to receive a packet from a first host and the second component is configured to deliver the packet to a second host.

4. The apparatus of claim 3 wherein the routing table used to identify the egress port is computed by identifying a port that leads to the second host.

5. The apparatus of claim 3 wherein:
   the first component is configured to broadcast the ARP request;
   the intermediate component is configured to forward the ARP request to the second component without a routing table look-up; and
   the second component is configured to receive the ARP request and to send the response that includes the hardware address back to the first component.

6. The apparatus of claim 1 wherein the first component is configured to encapsulate the packet with the hardware address of the second component and to forward the encapsulated data packet through the intermediate component to the second component.

7. The apparatus of claim 6 wherein the second component is configured to route the encapsulated data packet received through the intermediate component to a second host.

8. The apparatus of claim 1 wherein the first component, the intermediate component, and the second component are connected through a network medium.

9. The apparatus of claim 8 wherein the network medium comprises Ethernet.

10. The apparatus of claim 1 wherein the networking router architecture comprises a modularized network element that includes the first component, the second component, and the intermediate component, the position of the components in the network element changing based on a path of the data.

11. A method comprising: performing a lookup in a routing table to determine a proxy egress port by which data is to leave a first component;
sending a request for an address of an egress component by which the data is to leave a networking router architecture to reach a receiver, wherein the receiver is outside of the network router architecture;
receiving a reply to the request, the reply including the address of the egress component wherein the network router architecture comprises the first component, the intermediate component, and the egress component;
labeling the data with the address to identify the egress component; and
forwarding the data, based on the address, through an intermediate component acting as a transparent bridge to the egress component.

12. The method of claim 11 wherein the data is forwarded through additional intermediate components without a routing table look up the network router architecture further comprises the additional intermediate components.

13. The method of claim 11 further comprising broadcasting the request for the address of the egress component from the intermediate component.

14. The method of claim 13 further comprising:
forwarding the request for the address through the intermediate component; and
sending the reply from the egress component to the intermediate component; and
forwarding the reply from the intermediate component without looking up the routing table to the component that sent the request for the address.

15. The method of claim 11 wherein:
labeling the data with the address comprises encapsulating a data packet with a media access control (MAC) address of the egress component; and
forwarding the data comprises forwarding the encapsulated data packet to the egress component through the intermediate component without a routing table look-up.

16. The method of claim 15 further comprising:
routing the data packet from the egress component to the receiver.

17. The method of claim 11 wherein: the networking router architecture comprises a modularized network element that includes the egress component and the intermediate component; and the position of the components in the network element changes based on the path.

18. An article comprising one or more machine-readable media, the one or more machine-readable media encoded with machine-executable instructions, the machine-executable instructions for causing one or more machines to:
perform a look up in a routing table to determine a proxy egress port by which data is to leave the one or more machines;
send a request for a media access control (MAC) address of an egress component by which the data is to leave a networking router architecture to reach a receiver, wherein the receiver is outside of the networking router architecture;
receive a reply to the request, the reply including the MAC address of the egress component;
label the data with the MAC address of the egress component; and
forward the data, based on the MAC address, through an intermediate component acting as a transparent bridge to the egress component wherein the network router architecture comprises the one or more machines, the intermediate component, and the egress component.

19. The article of claim 18, wherein the machine-executable instructions are further for causing the one or more machines to:
receive the data in a packet from the sender; and
broadcast the request for the MAC address of the egress component from the intermediate component.

20. The article of claim 18, wherein
the machine-executable instructions are further for causing the one or more machines to:
encapsulate a packet comprising the data with the MAC address of the egress component; and
forward the encapsulated packet to the egress component through the intermediate component without a routing table look-up.

21. The article of claim 20, wherein the machine-executable instructions are further for causing the one or more machines to:
route the packet from the egress component to the receiver.

22. The article of claim 18, wherein: the networking router architecture comprises a modularized network element that includes the egress component and the intermediate component; and the position of the components in the network element changes based on the path.

* * * * *